(12) United States Patent
Boubez

(10) Patent No.: US 10,103,960 B2
(45) Date of Patent: Oct. 16, 2018

(54) SPATIAL AND TEMPORAL ANOMALY DETECTION IN A MULTIPLE SERVER ENVIRONMENT

(71) Applicant: Splunk Inc., San Francisco, CA (US)

(72) Inventor: Toufic Boubez, Vancouver (CA)

(73) Assignee: SPLUNK INC., San Francisco, CA (US)

( * ) Notice: Subject to any disclaimer, the term of this patent is extended or adjusted under 35 U.S.C. 154(b) by 344 days.

(21) Appl. No.: 14/765,324

(22) PCT Filed: Dec. 23, 2014

(86) PCT No.: PCT/CA2014/051267
§ 371 (c)(1),
(2) Date: Jul. 31, 2015

(87) PCT Pub. No.: WO2015/095974
PCT Pub. Date: Jul. 2, 2015

(65) Prior Publication Data
US 2016/0226737 A1  Aug. 4, 2016

Related U.S. Application Data

(60) Provisional application No. 61/921,383, filed on Dec. 27, 2013.

(51) Int. Cl.
*H04L 12/26* (2006.01)
*H04L 12/24* (2006.01)

(52) U.S. Cl.
CPC ...... *H04L 43/0876* (2013.01); *H04L 41/0686* (2013.01); *H04L 41/0883* (2013.01); *H04L 43/04* (2013.01)

(58) Field of Classification Search
None
See application file for complete search history.

(56) References Cited

U.S. PATENT DOCUMENTS

| | | |
|---|---|---|
| 9,122,602 B1 | 9/2015 | Jewell et al. |
| 2005/0022003 A1 | 1/2005 | Oliphant |
| 2005/0193076 A1 | 9/2005 | Flury et al. |
| 2005/0210465 A1 | 9/2005 | Sasaki et al. |
| 2006/0293777 A1* | 12/2006 | Breitgand ............... H04L 41/00 700/108 |
| 2007/0005297 A1* | 1/2007 | Beresniewicz .... G05B 23/0235 702/181 |

(Continued)

OTHER PUBLICATIONS

International Search Report and Written Opinion dated Apr. 9, 2015, for International Application No. PCT/CA2014/051267, 9 pages.

(Continued)

*Primary Examiner* — Kevin Bates
*Assistant Examiner* — Lesa Kennedy
(74) *Attorney, Agent, or Firm* — Perkins Coie LLP

(57) ABSTRACT

An anomaly detection system is able to detect spatial and temporal environment anomalies and spatial and temporal behavior anomalies, and monitor servers for anomalous characteristics of the environment and behavior. If metrics and/or characteristics associated with a given server are beyond a certain threshold, an alert is generated. Among other options, the alert can take the form of a heat map or a cluster cohesiveness report.

29 Claims, 14 Drawing Sheets

(56) References Cited

U.S. PATENT DOCUMENTS

| | | | |
|---|---|---|---|
| 2008/0091630 A1* | 4/2008 | Bonissone | G05B 23/024 706/45 |
| 2009/0077171 A1 | 3/2009 | Kasha | |
| 2009/0260000 A1 | 10/2009 | Pilant et al. | |
| 2010/0284283 A1* | 11/2010 | Golic | H04L 63/1416 370/242 |
| 2011/0098973 A1* | 4/2011 | Seidman | G06F 11/0709 702/179 |
| 2011/0238377 A1* | 9/2011 | Scarpelli | G06F 11/3409 702/186 |
| 2012/0192008 A1 | 7/2012 | Suzuki | |
| 2015/0163121 A1* | 6/2015 | Mahaffey | G06F 11/0766 707/687 |
| 2015/0341246 A1 | 11/2015 | Boubez | |
| 2016/0217378 A1 | 7/2016 | Bellala et al. | |

OTHER PUBLICATIONS

Final Office Action dated Apr. 26, 2018, for U.S. Appl. No. 14/815,941 of Boubez filed Jul. 31, 2015, 32 pages.
Non-Final Office Action dated Sep. 22, 2017, for U.S. Appl. No. 14/815,941 of Boubez filed Jul. 31, 2015.
Barford, et al., "A Signal Analysis of Network Traffic Anomalies", IMW "02; Marseille, France, Nov. 6-8, 2002, pp. 71-82.

* cited by examiner

SPATIAL AND TEMPORAL ANOMALY DETECTION IN A MULTIPLE SERVER ENVIRONMENT

CROSS-REFERENCE TO RELATED APPLICATIONS

This application is a national phase application claiming benefit of International patent application PCT/US2014/051267, having an international filing date of Dec. 23, 2014. PCT/US2014/051267 claims priority from U.S. Provisional Patent Application Ser. No. 61/921,383, filed Dec. 27, 2013 and entitled "System and Method for Anomaly Detection in Information Technology Operations". Both of these applications are hereby incorporated by reference in their entirety.

FIELD OF THE INVENTION

The present invention relates to systems and/or methods for anomaly detection in Information Technology (IT) operations, and more specifically, to systems and/or methods for detection of spatial and temporal manifestations of environment and behavior anomalies in servers, data sets and software applications.

BACKGROUND OF THE INVENTION

A data center is a facility used to house computing hardware that can include servers, storage systems and telecommunications equipment. Typically a data center comprises multiple servers. Servers can be physical, virtual, or cloud-based machines. A data center, or more generally a computing system, can comprise software such as application software, system software and the like. The software can run on the servers.

A data center can comprise large clusters of related servers. As data center infrastructure grows, it becomes important to monitor the configuration and health of the servers automatically, and to alert an operator when anomalies occur. The configuration of the data center can include the configuration of hardware and software. The software configuration can include, for example, the configuration of application software and system software running on the servers.

A data center is a dynamic environment and anomalies can occur frequently in data center operations. Anomalies can be associated with software and/or hardware. It is common for software to be undergoing continuous deployment. The software environment is changing frequently, for example when software is being updated to a new version. Hardware changes are also frequent—with machines being spun up and down, especially in virtual or cloud environments.

The environment can be chaotic and overwhelming for manual detection methods. It is not practical to sit and watch the operations all the time for anomalies. There is a need for methods and systems for automated anomaly detection in data center operations.

It can be hard to detect anomalies and they can cause significant disruption in computer systems and networks. Considerable effort can be spent trying to find anomalies. It is advantageous to have efficient automated ways to find anomalies in a timely fashion.

Examples of the detection of anomalies by monitoring, analysis or data-mining of system event logs have been discussed. The system and method described herein is related to anomaly detection through static and dynamic analysis of files, packages (such as installed software applications), and metadata.

Earlier work also discloses threshold-based approaches, for example alerting an operator when a disk is 90% full. The system and method described herein can identify and measure trends, and can anticipate problems before thresholds are triggered.

SUMMARY OF THE INVENTION

A method for detecting a spatial environment anomaly in a system with a plurality of servers includes: monitoring a configuration of each of the plurality of servers and generating an alert associated with a configuration difference selected from the group consisting of a first server of the plurality of servers having a substantively different configuration than other servers of the plurality of servers, and a first server of the plurality of servers having a different configuration than other servers of the plurality of servers with respect to configuration element designated by a user.

In some embodiments the configuration is a software configuration. The software configuration can be, among other things, one or more installed software applications or one or more configuration files. In some embodiments at least one of the configuration files specifies the configuration of an installed software application.

A method for detecting a temporal environment anomaly in a server includes: monitoring a configuration of the server at a first time and a second time; and generating an alert associated with a change in the configuration between the first time and second time wherein the change is more than a predetermined threshold between the first time and the second time and/or related to a configuration element designated by a user.

In some embodiments the server is one of a plurality of servers in a system.

In some embodiments the configuration is a software configuration. The software configuration can be, among other things, one or more installed software applications or one or more configuration files.

A method for detecting a spatial behavior anomaly in a system with a plurality of servers includes: receiving a set of metrics from each of the plurality of servers at one or more times during a time period; segmenting the time period into one or more time windows; calculating one or more statistics for at least one metric of the set of metrics for each of the plurality of servers for each of the time windows (in some embodiments the statistics calculated are the mean, standard deviation, kurtosis and/or entropy).

The method further includes concatenating the metrics and the statistics into a corresponding n-dimensional feature vector for each of the plurality of servers (in some embodiments the n-dimensional feature vector is a projection of a higher dimensional space onto n dimensions); calculating one or more spectral characteristics of the metrics; concatenating the spectral characteristics into the n-dimensional feature vector; computing a center of mass in n-dimensional space of the feature vectors; computing a distance measurement from the feature vector of a first server of the plurality of servers to the center of mass; determining a degree of anomaly of the first server based on the distance measurement; monitoring the degree of anomaly of the first server; and generating an alert when the degree of anomaly of the first server exceeds a predetermined threshold.

In some embodiments the metrics include one or more asynchronous time-stamped log entries, memory usage, CPU usage, traffic and load, and/or synchronous time series metrics. In other or the same embodiments, the metrics are either real-time metrics or replays of metrics collected prior to the start of the time period.

In other or the same embodiments, the method further includes, after receiving a set of metrics from each of the plurality of servers at one or more times during a time period, the step of transforming the one or more asynchronous time-stamped log entries into one or more synchronous time series metrics.

In some embodiments the spectral characteristics are wavelet coefficients or Fourier coefficients. In other of the same embodiments, the distance measurement can be a Euclidean distance, L1 (Manhattan) distance, or Canberra distance.

In some embodiments the projection is derived from a Principal Components Analysis. In other or the same embodiments the set of metrics is received by an agent installed on each of the plurality of servers.

A method of detecting a temporal behavior anomaly in a server, includes receiving a set of metrics from the server at one or more times during a time period; segmenting the time period into one or more time windows; calculating one or more statistics for at least one metric of the set of metrics for the server for each of the time windows; concatenating the metrics and the statistics into a corresponding n-dimensional feature vector for each of the time windows; calculating one or more spectral characteristics of the metrics, concatenating the spectral characteristics into the n-dimensional feature vector; computing a center of mass in n-dimensional space of the feature vectors; computing a distance measurement from a first feature vector of the feature vectors to the center of mass, the first feature vector corresponding to a first time window; determining a degree of anomaly of the server based on the distance measurement; monitoring the degree of anomaly of the server: and generating an alert when the degree of anomaly of the server exceeds a predetermined threshold.

In some embodiments the metrics includes one or more asynchronous time-stamped log entries and/or synchronous time series metrics. In other, or the same embodiments, the set of metrics are real-time metrics or replays of metrics collected prior to the start of the time period. In some embodiments, the one or more asynchronous time-stamped log entries can be converted into one or more synchronous time series metrics.

In some embodiments the server is one of a plurality of servers in a system.

A method for detecting anomalies in a system with one or more servers, the method includes: receiving at least one metric corresponding to at least one server of the one or more servers; computing statistics associated with the at least one metric; applying the at least one metric and the statistics to detect at least one anomaly in the system, the at least one anomaly selected from the group consisting of spatial environment anomalies, temporal environment anomalies, spatial behavior anomalies and temporal behavior anomalies; determining the degree of the anomaly, and monitoring the persistence of the anomaly; and generating an alert to an operator of the system. In some embodiments the alert is generated when the degree exceeds a first threshold and the persistence exceeds a second threshold.

In one embodiment the alert is generated based on the detection of at least one environment anomaly and at least one behavior anomaly.

A method for detecting anomalies in a system with one or more software applications, includes: receiving at least one metric corresponding to at least one software application of the one or more software applications; computing statistics associated with the at least one metric; applying the at least one metric and the statistics to detect at least one anomaly in the system, the at least one anomaly selected from the group consisting of spatial environment anomalies, temporal environment anomalies, spatial behavior anomalies and temporal behavior anomalies; determining the degree of the anomaly; monitoring the persistence of the anomaly; and generating an alert to an operator of the system. In some embodiments the alert is generated when the degree exceeds a first threshold and the persistence exceeds a second threshold.

In some embodiments, the alert is generated based on the detection of at least one environment anomaly and at least one behavior anomaly.

A method for detecting anomalies in a system with one or more sensors, includes: receiving at least one metric corresponding to at least one sensor of the one or more sensors; computing statistics associated with the at least one metric; applying the at least one metric and the statistics to detect at least one anomaly in the system, the at least one anomaly selected from the group consisting of spatial environment anomalies, temporal environment anomalies, spatial behavior anomalies and temporal behavior anomalies; determining the degree of the anomaly; monitoring the persistence of the anomaly and generating an alert to an operator of the system.

In some embodiments then alert is generated when the degree exceeds a first threshold and the persistence exceeds a second threshold.

In some embodiments the alert is generated based on the detection of at least one environment anomaly and at least one behavior anomaly.

In some embodiments the metric includes sensor data from the one or more sensors.

The above methods can be implemented by various devices.

Overview of Anomalies

An anomaly can be an environment anomaly or a behavior anomaly.

An environment anomaly can also be known as a static anomaly or a configuration anomaly. A behavior anomaly can also be known as a dynamic anomaly.

An environment anomaly can be a spatial environment anomaly or a temporal environment anomaly. Similarly, a behavior anomaly can be a spatial behavior anomaly or a temporal behavior anomaly.

The system and method described herein can provide a number of benefits including, but not limited to, the following functions:
  (a) detection of environment anomalies and the monitoring of servers for anomalous characteristics of the environment:
    (i) detection of spatial environment anomalies;
    (ii) detection of temporal environment anomalies;
  (b) detection of behavior anomalies and the monitoring of servers for anomalous behavior:
    (i) detection of spatial behavior anomalies;
    (ii) detection of temporal behavior anomalies;
  (c) hybrid detection (environment and behavior); and
  (d) generation of alerts to the operator.

The system and method described herein can include the following functions:
  1. Cohesive analysis in which the detection of spatial behavior anomalies can comprise superimposing one time window from multiple metrics to determine if one of those metrics is anomalous; and 2. Cohesive trending in which cohesive analysis is used in the detection of temporal behavior anomalies by superimposing multiple time windows of one metric in order to determine whether the current time window is anomalous.

Environment Anomaly Detection

Spatial environment anomalies are examples of environment anomalies and are manifest as differences or anomalies between a set of servers at a particular point in time. Some differences between servers are not regarded as anomalous, for example IP addresses, and these differences can be "whitelisted" and ignored.

Temporal environment anomalies are other examples of environment anomalies and are manifest as differences or anomalies in the environment of one or more servers between two different points in time. Detection of temporal anomalies can be achieved by taking "snapshots" of the files, packages and metadata on one or more servers, and looking for changes on each server.

Behavior Anomaly Detection

Spatial behavior anomalies are examples of behavior anomalies and are manifest as differences or anomalies between a set of servers or a set of metrics at a particular point in time.

Temporal behavior anomalies are other examples of behavior anomalies and are manifest as differences or anomalies in the behavior of one or more servers or one or more metrics between two different points in time.

Behavior anomaly detection can be achieved by collecting metrics on one or more servers. Suitable metrics can include infrastructure and operational data such as:

(a) memory usage;
(b) central processing unit (CPU) usage;
(c) disk input/output (I/O);
(d) traffic, and
(e) load.

In this application, "traffic" means the amount of data sent and received per second on a server's Network Interface Controller (NIC).

In this application, "load" means the number of running processes on a server. For the purposes of deriving a load metric, this can be computed, for example, as the exponentially-weighted moving average of the load number over one or more fixed time intervals such as the past minute, 5 minutes, and 15 minutes. The load metric is computed by counting running processes where "running" means running or waiting in the process queue. Therefore, a load metric of 1.0 means the server is fully loaded. A load metric of 0.75, for example, indicates there is spare capacity. A load metric of 1.25, for example, indicates the server is overloaded.

Such metrics can also include many types of application-specific data that can be represented as time series data, such as:

(i) user logins per second;
(ii) video stream requests per minute;
(iii) PDF download requests per minute; and
(iv) sales volume per hour.

The metrics are dynamic characteristics of the system, and can show change or anomalies spatially and temporally. Spatial anomalies are when the behavior of one server is different than other servers at a point in time. Temporal anomalies are when the behavior of one or more servers is changing with respect to time.

Metrics can be of two general types: a) synchronous time series metrics, and b) asynchronous time-stamped log entries.

Synchronous time series metrics can take the form of a series of time stamp and value tuples generated at a regular, synchronous interval. Examples can include the number of user requests per second, and the CPU load per second.

Asynchronous time-stamped log entries generally correspond to the logging of events, the events able to occur at any time and not necessarily synchronous to other events. Asynchronous time-stamped log entries can be bursty, meaning that the rate at which asynchronous time-stamped log entries occur can vary as a function of time.

Asynchronous time-stamped log entries can be transformed by the system into synchronous time series metrics by extracting one or more log entries at regular time intervals and generating a value for each time stamp. The value can be based on the type of log entry.

For example, for some log entries such as user requests to a server, the system can construct a time series describing the volume of user requests by computing the number of log entries (user requests in this example) within a specified time interval. The volume of user requests can be expressed, for example, as the number of user requests per second.

In another example, such as packet data logs, the system can compute the average packet size over a specified time interval to generate a synchronous time series of average packet size per second. In yet another example, the system can compute a minimum value over a time interval or a maximum value over a time interval.

By transforming asynchronous time-stamped log entries into synchronous time series metrics, the system can combine two types of metrics in an analytic engine to provide improved anomaly detection.

Hybrid (Environment and Behavior) Anomaly Detection

Anomalies can also be detected through a hybrid approach of environment and behavior anomaly detection. For example, anomalies can be detected by observing code changes that lead to changes in behavior or are associated with changes in behavior.

DETAILED DESCRIPTION OF PREFERRED EMBODIMENT(S)

Figure 1:
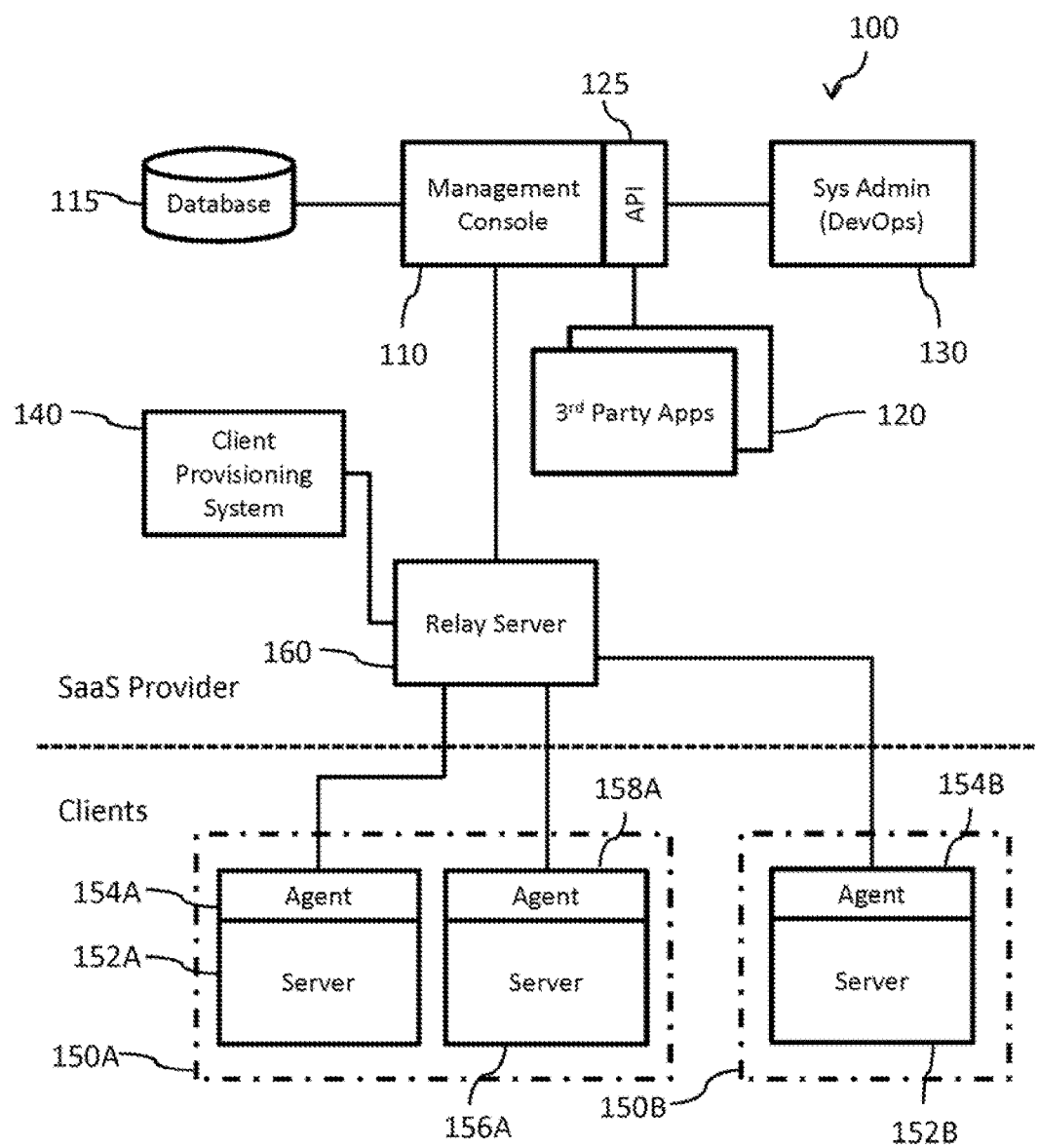
FIG. 1 is a block diagram of an embodiment of an anomaly detection system.

FIG. 1 is a block diagram of an embodiment of anomaly detection system 100. FIG. 1 comprises a first set of elements associated with a Software as a Service (SaaS) provider and a second set of elements associated with one or more clients of the SaaS provider.

The first set of elements comprises management console 110 connected to database 115. Management console 110 is connected to third party applications 120 via Applications Programming Interface (API) 125. System administrator 130 (sometimes referred to as DevOps) can communicate with management console 110 via API 125. Management console 110 is connected to client provisioning system 140 and client systems 150A and 150B via relay server 160.

Client system 150A comprises first server 152A with first installed agent 154A, and second server 156A with second installed agent 158A. Client system 150B comprises server 152B with installed agent 154B.

Any suitable protocol can be used by relay server 160 to communicate with agents 154A, 158A and 154B. In some embodiments, Extensible Messaging and Presence Protocol (XMPP) can be used as the communications protocol between relay server 160 and agents 154A, 158A and 154B. XMPP facilitates client-server messaging using two open-ended XML streams. XMPP has been used as a chat protocol, for example for instant messaging. In embodiments of system 100 using XMPP, one benefit of the protocol are security features built into the specifications. An XMPP connection is authenticated using Simple Authentication and Security Layer (SASL) protocol and encrypted using Transport Layer Security (TLS) protocol. Another benefit of XMPP is its presence capability. As an agent is started, the agent announces itself to the server automatically, with no need for user involvement.

Figure 2:
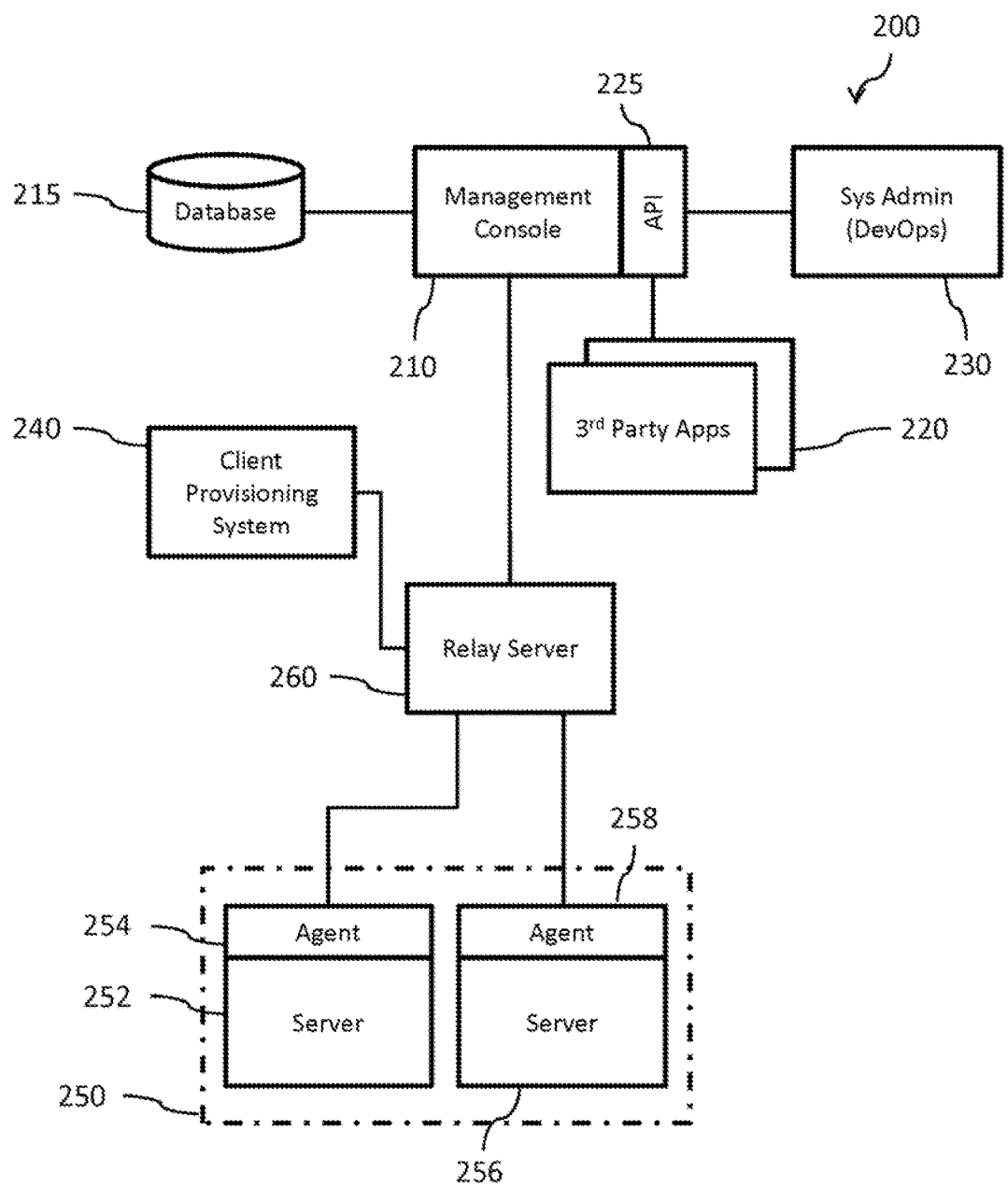
FIG. 2 is a block diagram of another embodiment of an anomaly detection system.

FIG. 2 is a block diagram of another embodiment of anomaly detection system 200. FIG. 2 illustrates an enterprise license deployment of anomaly detection system 200.

Anomaly detection system 200 comprises management console 210 connected to database 215. Management console 210 is connected to third party applications 220 via Applications Programming Interface (API) 225. System administrator 230 (sometimes referred to as DevOps) can communicate with management console 210 via API 225. Management console 210 is connected to client provisioning system 240 and client system 250 via relay server 260.

Client system 250 comprises first server 252 with first installed agent 254, and second server 256 with second installed agent 258.

Any suitable protocol can be used by relay server 260 to communicate with agents 254 and 258. In some embodiments, Extensible Messaging and Presence Protocol (XMPP) can be used as the communications protocol between relay server 260 and agents 254 and 258.

Figure 3:
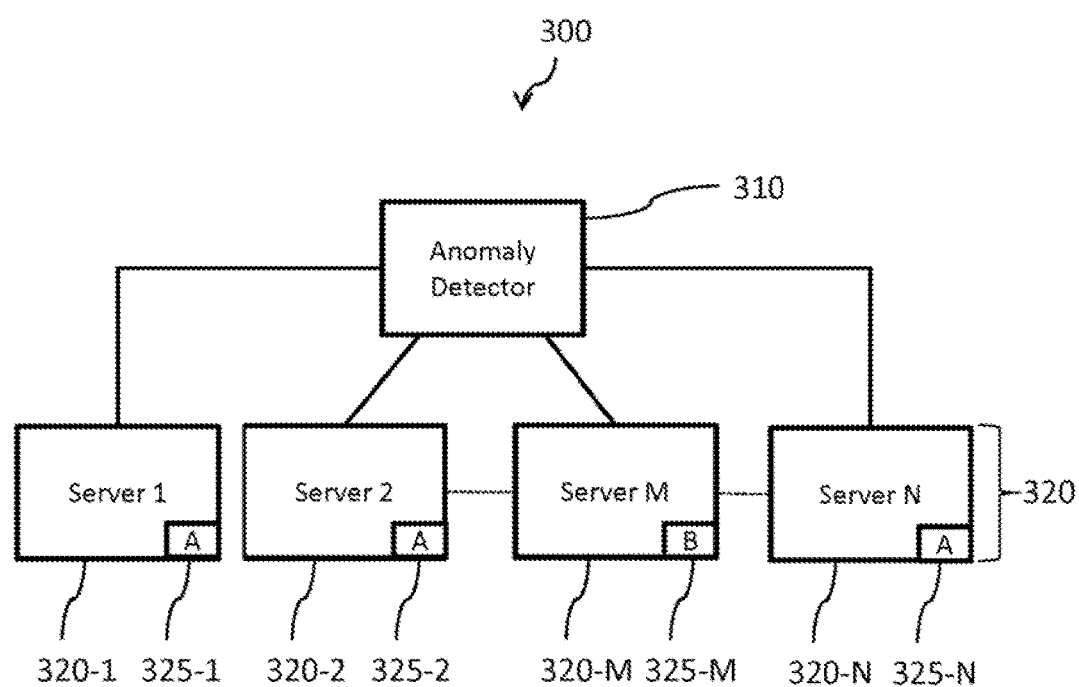
FIG. 3 illustrates a representative configuration for detection of a spatial anomaly.

FIG. 3 illustrates an example configuration 300 for detection of a spatial anomaly. Configuration 300 comprises anomaly detector 310. Anomaly detector 310 is connected to cluster of servers 320. Cluster 320 comprises N servers, 320-1 through 320-N. In the example shown, and with the exception of server 320-M, servers 320-1 through 320-N each comprise version A of an installed software application. Server 320-M comprises version B of an installed software application. Anomaly detector 310 can be configured to detect 320-M as a spatial anomaly.

Typically, a spatial anomaly can be determined to have occurred if the configuration of one server is substantively different to the configuration on another server. For example, a substantive difference can be a difference that is unexpected, significant or likely to cause difference in the performance of the system. A spatial anomaly can also be determined to have occurred if the configuration is different with respect to a configuration element designated by a user.

In one embodiment, the configuration can be one or more installed software applications. In another embodiment, the configuration can be one or more configuration files. The configuration files can specify the configuration of a specific application, for example the configuration of an Apache web server, or the configuration of a server's operating system (OS) such as open or closed ports, time zone or OS version.

Figure 4:
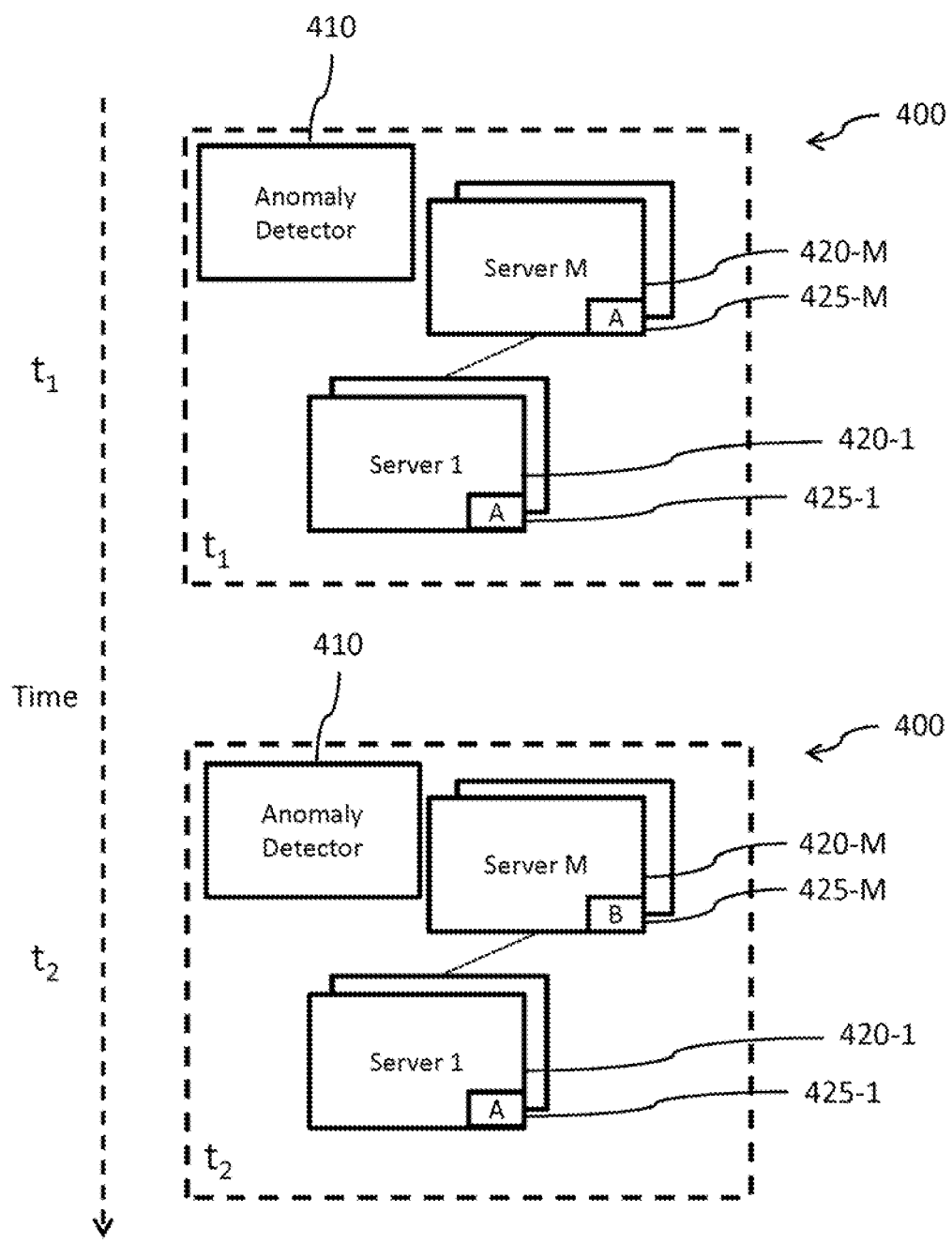
FIG. 4 illustrates a representative configuration for detection of a temporal anomaly.

FIG. 4 illustrates an example configuration 400 for detection of a temporal anomaly. Configuration 400 comprises anomaly detector 410. Anomaly detector 410 is connected to cluster of servers 420. Cluster 420 comprises N servers, 420-1 through 420-N. The configuration 400 is shown at two times in FIG. 4, at first time $t_1$ and at second time $t_2$ occurring after time $t_1$.

At time $t_1$, in the example shown, servers 420-1 through 420-N each comprise version A of an installed software application.

At time $t_2$, in the example shown, servers 420-1 through 420-N each comprise version A of an installed software application with the exception of server 420-M. Server 420-M comprises version B of an installed software application. Anomaly detector 410 can be configured to detect 420-M as a temporal anomaly.

Detecting differing software versions on various servers is merely illustrative of one type of the many types of anomalies that can be detected using the anomaly detection system. Its illustration here is in no way meant to be viewed as a limitation.

Figure 5:
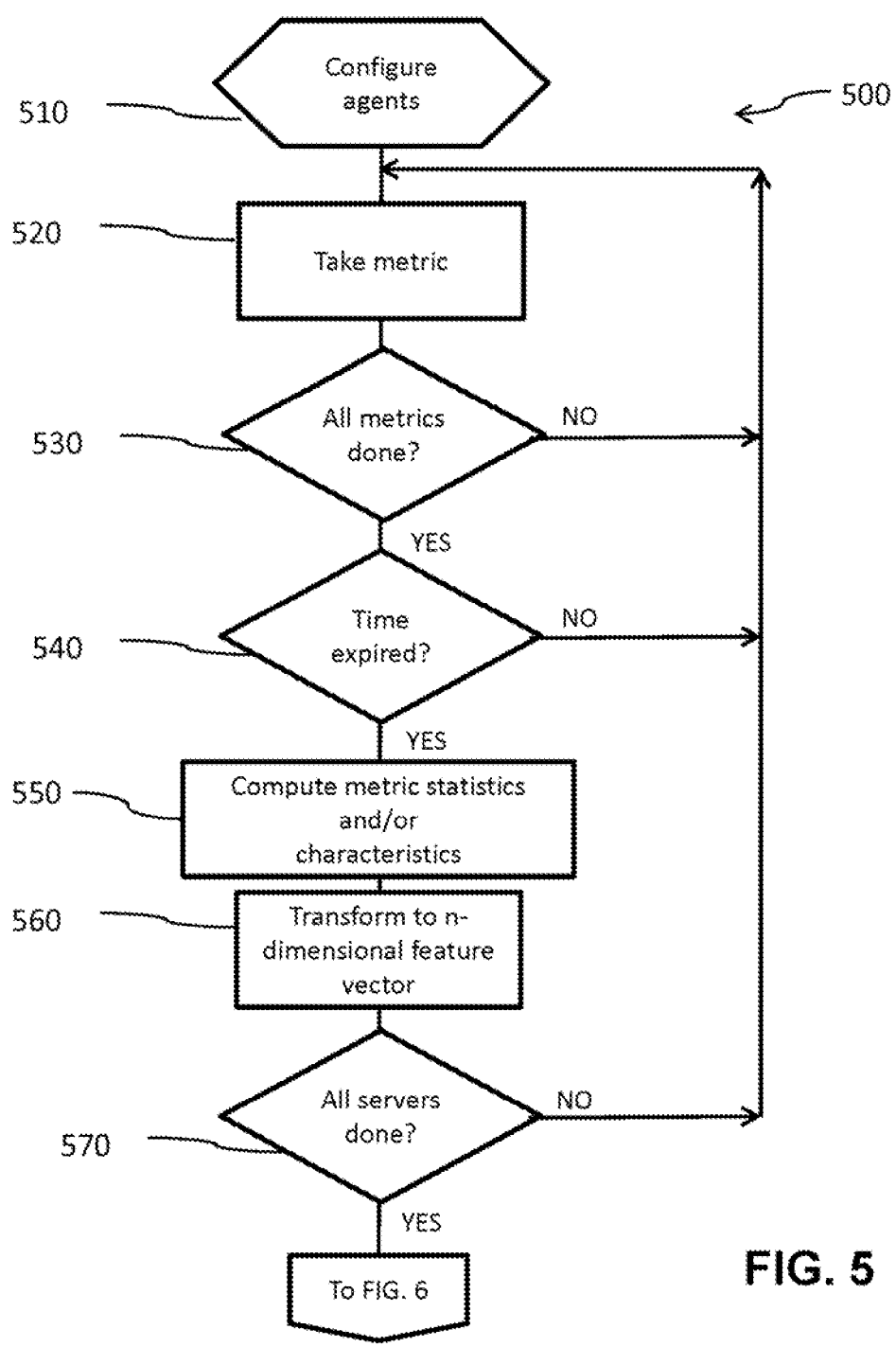
FIGS. 5 and 6 are flowcharts illustrating an embodiment of dynamic anomaly detection.
Figure 6:
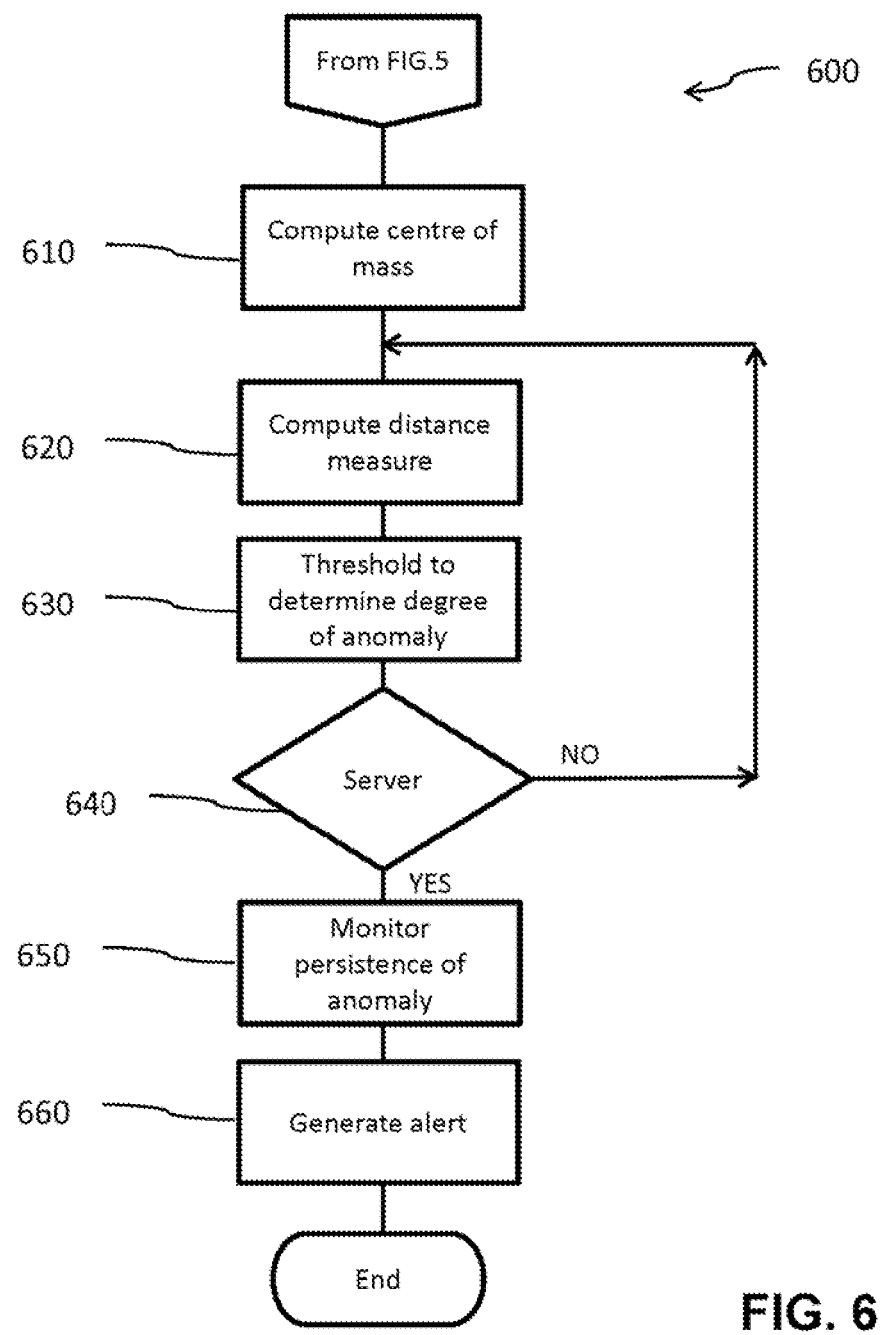

FIGS. 5 and 6 are flowcharts illustrating an embodiment of dynamic anomaly detection. At 510 of FIG. 5, in preparation for anomaly detection, one or more agents are configured on one or more servers, such as illustrated in FIG. 1 for example. At 520, a metric is taken. The metric is one of a set of metrics to be taken. The set of metrics can include, for example, memory usage, CPU usage, disk I/O, traffic, and load.

The time over which the system is observed can be divided into one or more time windows. The time windows can be of equal or unequal duration. The duration of the time windows can be selected based at least in part on the resolution of the data being collected from which the metrics are being determined.

Metrics can be real-time metrics or can be replays of metrics collected at a previous time, for example from historical data.

In some embodiments, the metrics are normalized. In some embodiments, the metric data are corrected, for example to compensate for small values which could adversely affect the results of the method.

At 530, a check is performed to see if all desired metrics belonging to the set of metrics have been taken. If no, then method 500 returns to step 520. If yes, then method 500 proceeds to step 540.

At 540, a check is performed to see if a time window for metric collection has expired. If no, then method 500 returns to step 520. If yes, then method 500 proceeds to step 550.

At 550, statistics and/or characteristics are calculated for the metrics. Statistics can include, but are not limited to, mean, standard deviation, kurtosis and entropy. At 560, the statistics for the metrics are transformed into a feature vector in n-dimensional space, and additional spectral and/or spatial features can be added. In some embodiments, wavelet decomposition is used to characterize the behavior of one or more of the servers. In some embodiments, the statistics and a set of wavelet coefficients are concatenated into a single n-dimensional feature vector. In other embodiments, Fourier coefficients are used to characterize the behavior of one or more servers, and are added to, or used in, the n-dimensional feature vector.

The n-dimensional feature vector can be a concatenation of data selected from the group consisting of i) the values of one or more metrics during a time window, ii) the statistical characteristics of the metric, and iii) the spectral characteristics of the metric. Spectral characteristics can include, for example, Fourier coefficients and wavelet coefficients.

At 570, a check is performed to see if statistics have been calculated for all desired servers. If no, then method 500 returns to step 550. If yes, then method 500 proceeds to step 610 of FIG. 6.

At 610 of FIG. 6, method 600 computes the center of mass of the feature vectors in n-dimensional space.

In an example embodiment, the center of mass can be computed as the average of the values of the feature vector along each dimension. In another example, the center of mass can be computed as the median of the values of the feature vector along each dimension. A benefit of using the median is that the center of mass can be less sensitive to outliers in the set of feature vectors. Other suitable measures can be used to compute the center of mass.

At 620, a measure of distance from a server to the center of mass is computed. The measure of distance can be one selected from the group consisting of Euclidean distance, L1 (Manhattan) distance and Canberra distance, or another suitable measure of distance. At 630, one or more thresholds are used to determine a degree of anomaly based on the measure of distance.

In some embodiments, more than one measure of distance is computed, and the results used in combination to provide an aggregate score.

Adaptive thresholds can be used for determining the degree of anomaly (also known as the anomaly score) based on distance of a server from the center of mass of the cluster. Machine learning can be employed to adjust and configure suitable thresholds. One approach is for the anomaly detection system to send alerts to the operator, and the operator to provide feedback to the system. The system can learn from the feedback and can adjust the threshold(s).

An adaptive threshold can be computed as the weighted average of one or more thresholds.

One method to computing a threshold is a follows. The method first computes the standard deviation of the values, and then sorts the data by value so that they are arranged in order from the largest value to the smallest value. In the next step, the method removes the smallest data point and re-computes the standard deviation for the remaining values. The method then checks to see if the re-computed standard deviation has changed significantly from the original standard deviation, for example if the change in standard deviation exceeds a predetermined threshold. If the re-computed standard deviation has changed significantly, then the adaptive threshold is set to the value of the data point last removed from the data set. If the re-computed standard deviation has not changed significantly, then the steps described above are repeated until the adaptive threshold is set. By this method, the adaptive threshold is set to the value of the smallest data point that has a significant influence on the standard deviation of the data set.

Another method for computing an adaptive threshold is based on an adjusted boxplot method. In a first step, the method divides the data into quartiles, two quartiles on either side of the median. Next, the method computes the lower quartile value, the inter-quartile range, and a gamma value based on a measurement of the degree of skew of the data. The method can then set the adaptive threshold to a value of the sum of the lower quartile value and the product of the gamma value and the inter-quartile range.

In some embodiments, the system can be configured to compute a True Positive Ratio (TPR) and a False Positive Ratio (FPR) to measure the effectiveness of the method at detecting anomalies. Furthermore, in some embodiments, the system can be configured with a threshold on the number of false positive alerts, depending on how chaotic the environment is. In some embodiments, the system can learn from the environment and adapt to it.

At 640, a check is performed to see if the degree of anomaly has been determined for all desired servers. If no, then method 600 returns to step 620. If yes, then method 600 proceeds to step 650. At 650, method 600 monitors the persistence of the anomaly. At 660, method 600 generates an alert.

In some embodiments, a technique can be used to reduce the number of dimensions of the feature vector to a smaller number, for example two dimensions. Principal components analysis (PCA) is an example of a technique suitable for reducing dimensionality. The alert generated by the anomaly detection system can comprise a two-dimensional display of results in the form of a heat map showing spatial and/or temporal anomalies. Anomalies can be displayed as "hotspots" in the heat map. In some embodiments, the alert can comprise a cluster cohesiveness report describing the degree of cohesiveness of the cluster of servers and highlighting at least some anomalous conditions or behavior on one or more servers in the cluster.

Figure 7:
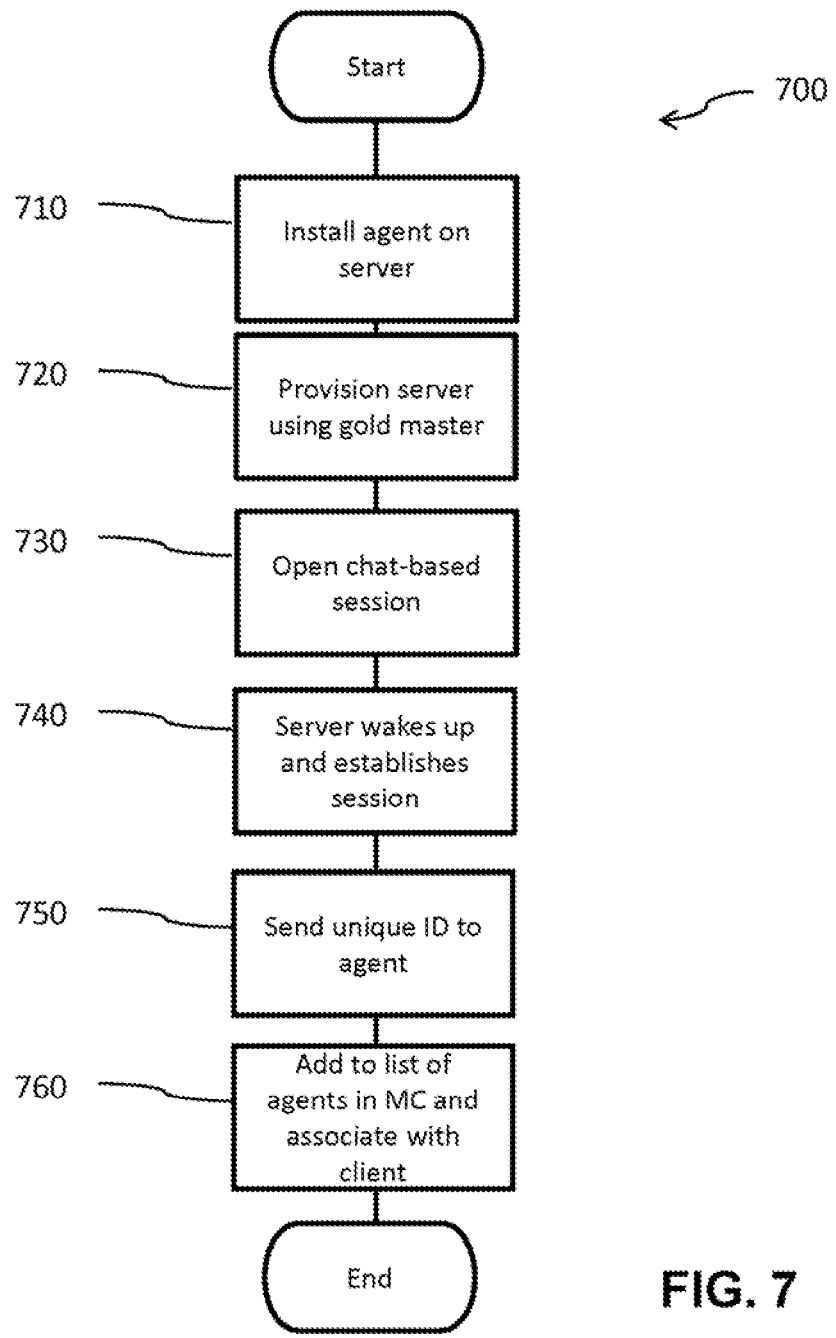
FIG. 7 is a flowchart illustrating configuration of an agent on a server in an embodiment of an anomaly detection system.

FIG. 7 is a flowchart illustrating configuration of an agent on a server in an embodiment of an anomaly detection system such as anomaly detection system 100 of FIG. 1. At 710, the agent is installed on the server. The server is associated with a client. At 720, the server is provisioned with software using a gold master. The gold master is the standard against which anomalies can be detected.

At 730, a management console of the anomaly detection system, such as management console 110 of FIG. 1, opens a chat-based session. At 740, the server wakes up and establishes the session. At 750, the management console sends a unique identifier (ID) to the agent installed on the server. At 760, the management console adds the agent and agent ID to a list of agents and agent IDs maintained at the management console and associated with the client.

Figure 8:
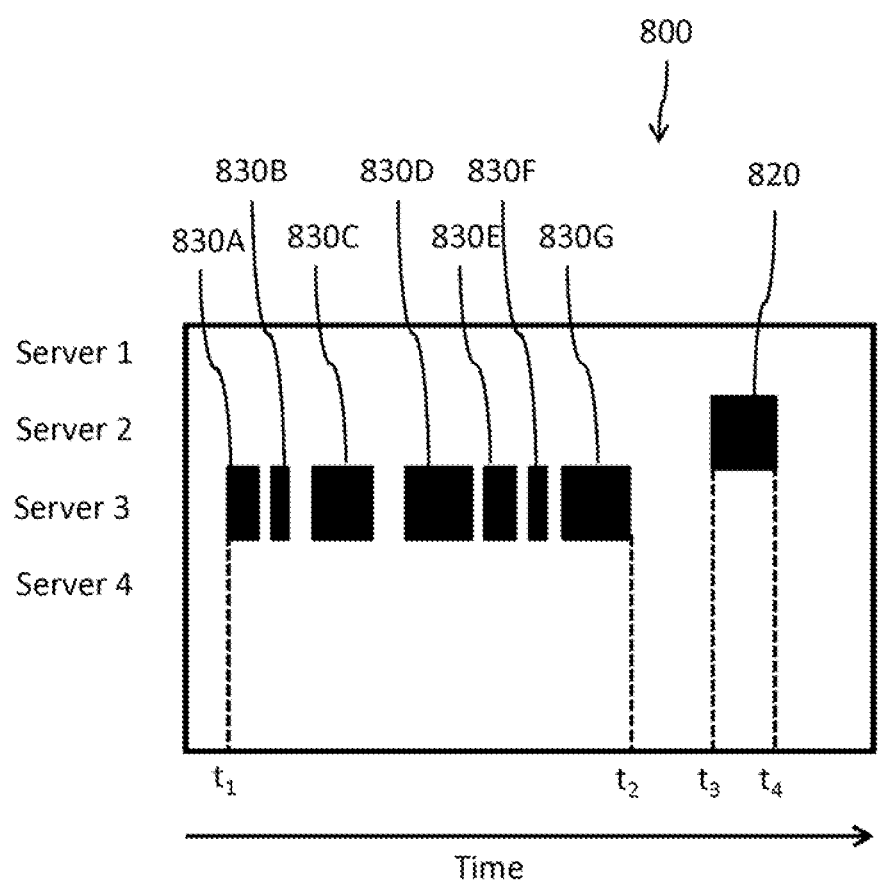
FIG. 8 is an example of a chart from a behavior anomaly report generated by an anomaly detection system.

FIG. 8 is an example of chart 800 from a behavior anomaly report generated by an anomaly detection system such as system 100 of FIG. 1. Chart 800 comprises a graphical indication of anomalous behavior, shown as a function of time, for each of four servers (Servers 1, 2, 3 and 4). In the example chart 800, Server 1 and Server 4 exhibit no anomalous behavior. Server 2 exhibits anomalous behavior 820 between times $t_3$ and $t_4$. Server 3 exhibits anomalous behavior 830A through 830G between times $t_1$ and $t_2$. Chart 800 can be color-coded, for example, according to the type and severity of anomaly. Chart 800 can be a graphical indication of when alerts to the operator were generated by the anomaly detection system.

Alerts generated by the system can be rated according to a determined level of severity, the level of severity determined at least in part based on one or more factors selected from the group consisting of i) the anomaly score, ii) the persistence of the anomaly, and iii) divergence from previous patterns.

The system can be configured to send a message to a user or an operator of the system in response to an alert. The message can be an email message, for example. The system can also be configured to trigger other actions in response to an alert. For example, the system can generate an HTTP POST to a throttling mechanism to cause an anomalous server to be placed in quarantine.

Figure 9:
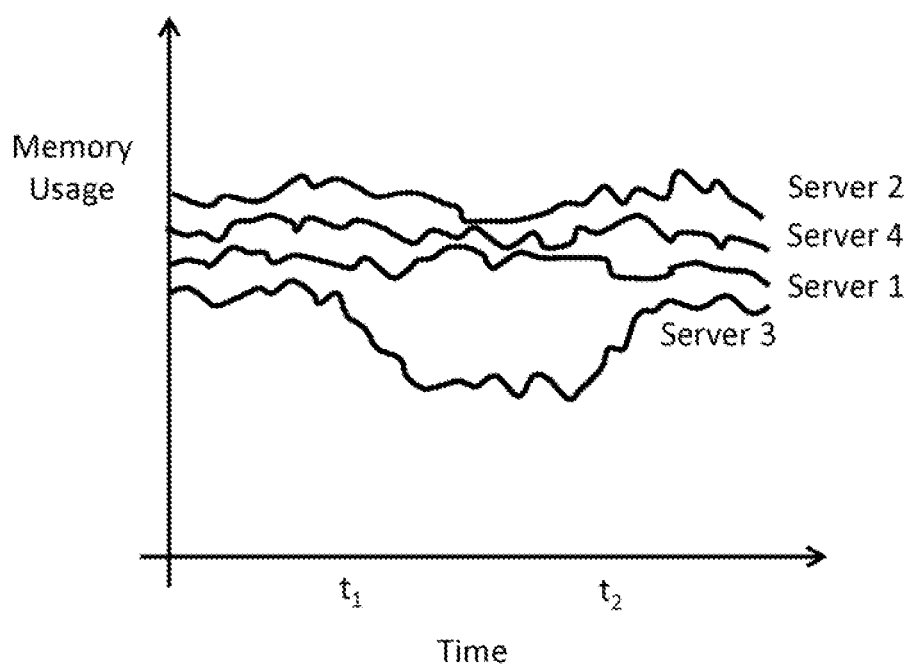
FIG. 9 is an example of a plot from a behavior anomaly report generated by an anomaly detection system.

FIG. 9 is an example of a plot from a behavior anomaly report generated by an anomaly detection system such as system 100 of FIG. 1. The plot of FIG. 9 corresponds to chart 800 of FIG. 8, for example. FIG. 9 shows memory usage of four servers (Servers 1, 2, 3 and 4) as a function of time. FIG. 9 indicates that, between times $t_1$ and $t_2$, memory usage of Server 3 falls significantly below its normal value. The drop in memory usage between times $t_1$ and $t_2$ is detected by the anomaly detection system as anomalous behavior, as also shown in FIG. 8.

Figure 10:
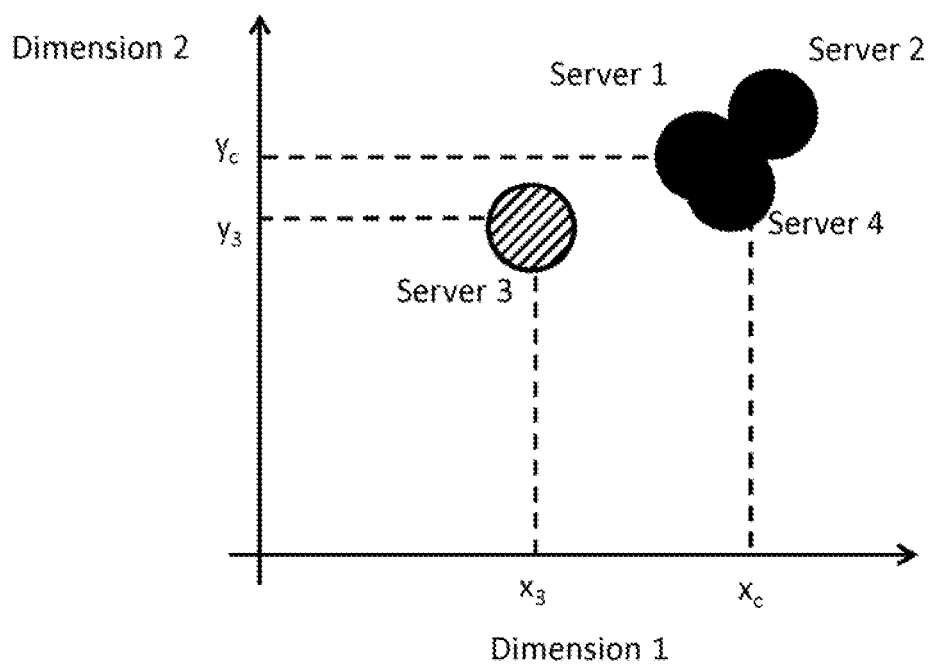
FIG. 10 is an example of a plot illustrating cluster cohesiveness.

FIG. 10 is an example of a plot illustrating cluster cohesiveness. The plot of FIG. 10 comprises a first dimension (Dimension 1) along the x-axis, and a second dimension (Dimension 2) along the y-axis. In some embodiments, these two dimensions (Dimension 1 and Dimension 2) are a projection of a much higher-dimensional space, onto the most significant two dimensions using PCA. The behavior of four servers (Servers 1, 2, 3 and 4) is plotted as a function of Dimensions 1 and 2 for a period of time. The behavior of Servers 1, 2 and 4 is clustered around the point $(x_c, y_c)$. The behavior of Server 3 is clustered around the point $(x_3, y_3)$.

In some embodiments, a tree differencing method can be used to show differences between deployed instances of systems and application software. The method computes the difference between two groups of tree-structured data.

Figure 11:
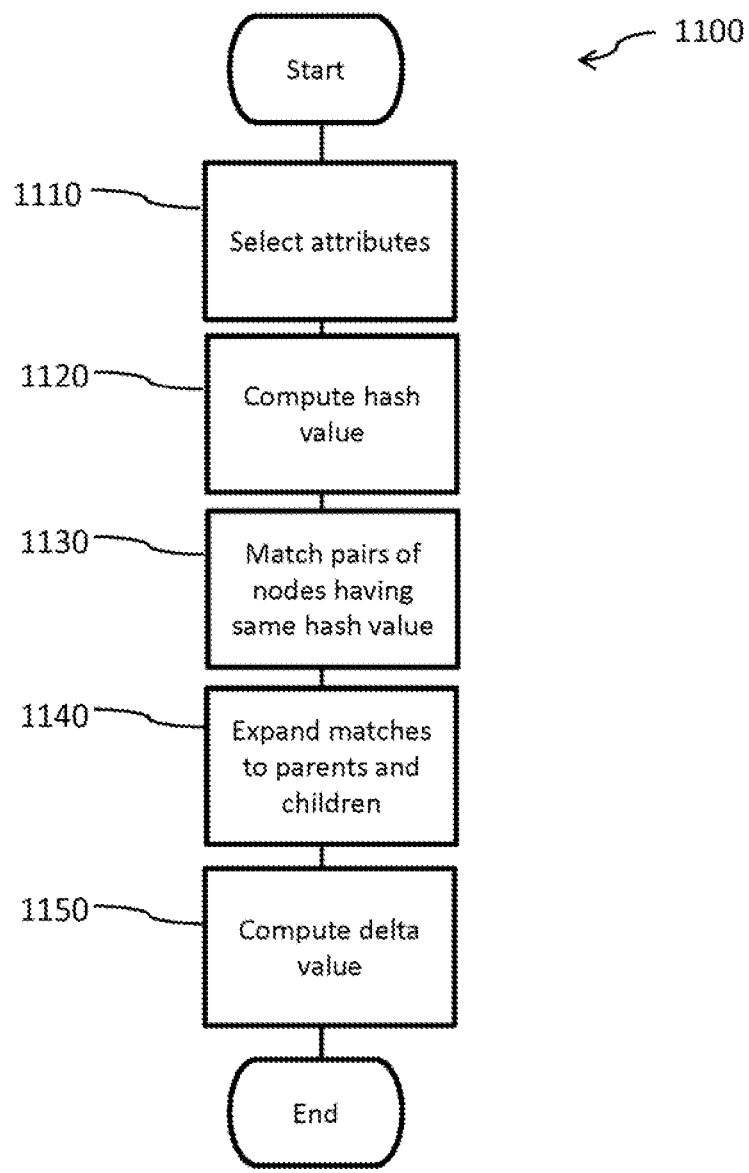
FIG. 11 is a flow chart showing a method for computing differences between deployed instances.

FIG. 11 is a flow chart showing a method 1100 for computing differences between deployed instances.

The first step is to define and compute hash values for each node. The next step is to use hash values of sub-trees to match the largest sub-trees that are identical between two trees. The number of matches is expanded by considering unmatched parents and children of matched nodes.

In the first step described above (step 1110 of FIG. 11), a set of attributes are selected for each tree node for computing the hash value of that node. With one traversal of each tree (step 1120), the hash value for each node can be computed using a non-cryptographic hash function suitable for general hash-based lookup (such as MurmurHash). In the next step (step 1130), starting from largest sub-trees, the method matches pairs of nodes having the same hash values.

In expanding the number of matches (step 1140), the method matches parents of each pair of matched nodes provided they are unpaired, have the same properties and have no children matched to different nodes. In addition, the method matches children of each pair of matched nodes provided they are unpaired and have the same properties.

In step 1150, the method computes a delta value representing the degree of difference between two trees. The method first computes all the deletions and insertions for unmatched nodes, and the effect of the deletions and insertions. Next, the method computes all of the move operations by finding matched pairs of nodes that have non-matching parents. The method also finds all matched pairs having different content. In a final step, the method computes the delta value.

Figure 12:
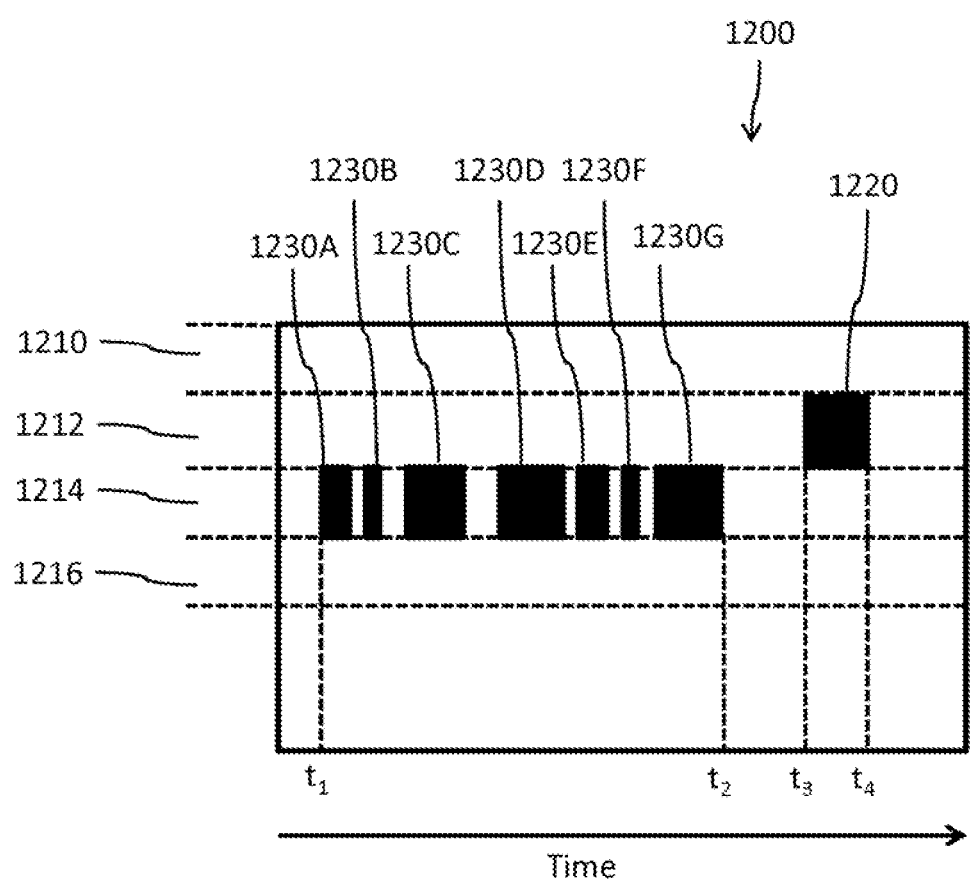
FIG. 12 is another example of a chart from a behavior anomaly report generated by an anomaly detection system.

FIG. 12 is another example of a chart from a behavior anomaly report generated by an anomaly detection system such as system 100 of FIG. 1. Chart 1200 comprises a graphical indication of anomalous behavior, shown as a function of time, for each of four entities 1210, 1212, 1214 and 1216. Entities 1210, 1212, 1214 and 1216 are sources of data that can be input to an anomaly detection system.

In one example embodiment, entities 1210, 1212, 1214 and 1216 can be software applications, and chart 1200 comprises a graphical indication of anomalous behavior for each of the four software applications 1210, 1212, 1214 and 1216.

In another example embodiment, entities 1210, 1212, 1214 and 1216 can be sensors, and chart 1200 comprises a graphical indication of anomalous behavior for each of the four sensors 1210, 1212, 1214 and 1216. The anomaly detection system can receive data from each of the four sensors 1210, 1212, 1214 and 1216, and can apply the same methods described above to detect anomalous behavior and generate alerts to a user or an operator.

Figure 13:
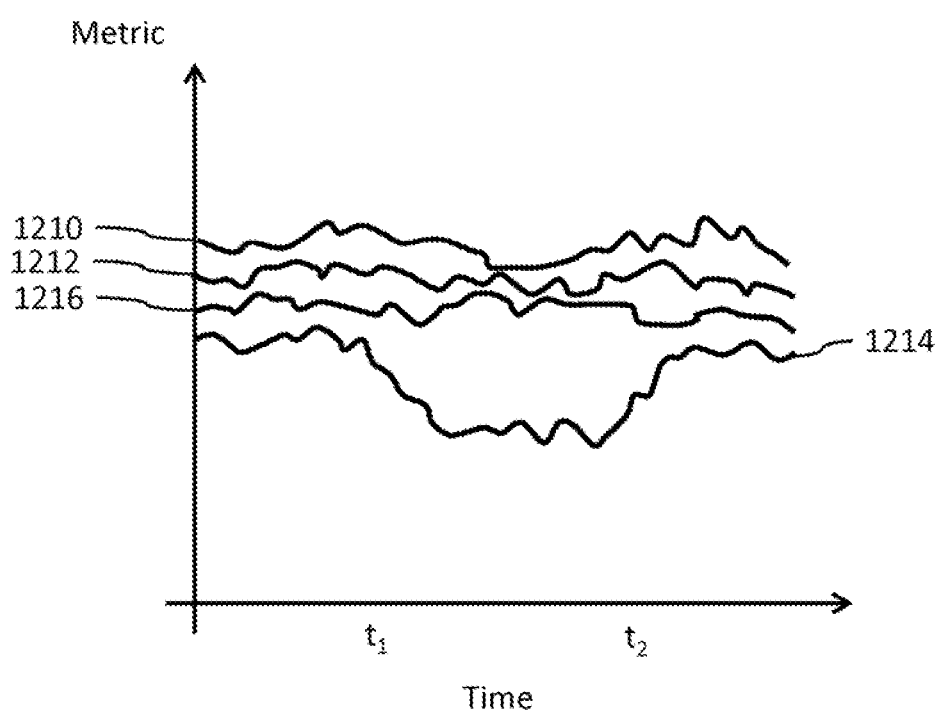
FIG. 13 is another example of a plot from a behavior anomaly report generated by an anomaly detection system.

FIG. 13 is another example of a plot from a behavior anomaly report generated by an anomaly detection system such as system 100 of FIG. 1. The plot of FIG. 13 corresponds to chart 1200 of FIG. 12, for example. FIG. 13 shows a metric for each of the four entities 1210, 1212, 1214 and 1216 as a function of time. FIG. 13 indicates that, between times $t_1$ and $t_2$, the value of the metric of entity 1214 falls significantly below its normal value.

Figure 14:
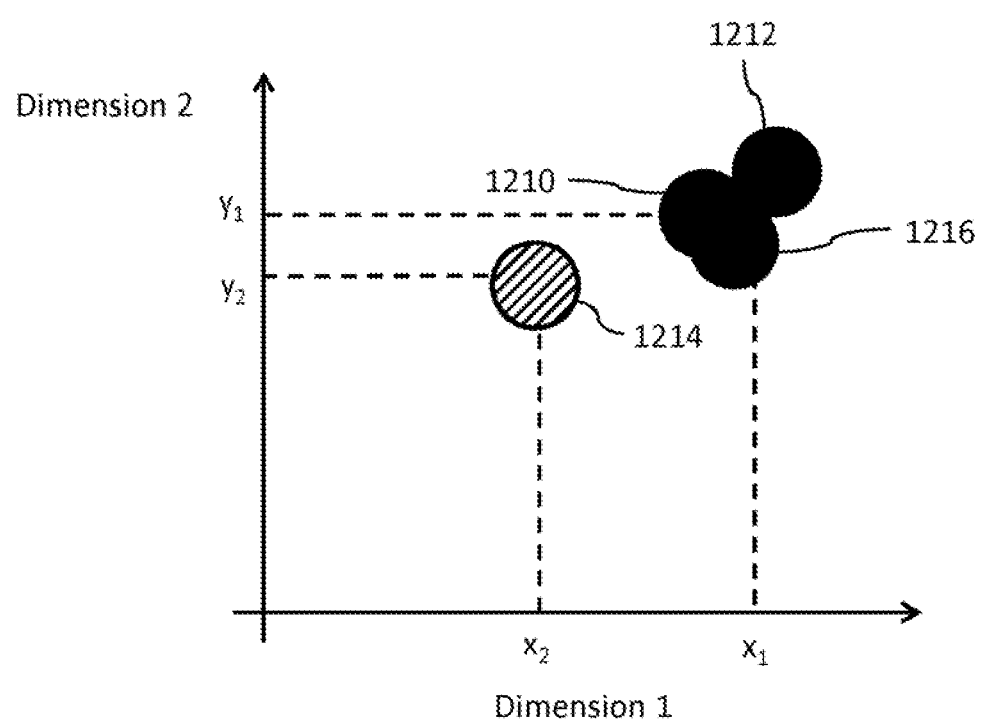
FIG. 14 is another example of a plot illustrating cluster cohesiveness.

FIG. 14 is another example of a plot illustrating cluster cohesiveness. The plot of FIG. 14 comprises a first dimension (Dimension 1) along the x-axis, and a second dimension (Dimension 2) along the y-axis. In some embodiments, these two dimensions (Dimension 1 and Dimension 2) are a projection of a much higher-dimensional space, onto the most significant two dimensions using PCA. The behavior of four entities 1210, 1212, 1214 and 1216 is plotted as a function of Dimensions 1 and 2 for a period of time. The behavior of entities 1210, 1212 and 1216 is clustered around the point $(x_1, y_1)$. The behavior of entity 1214 is clustered around the point $(x_2, y_2)$.

In various of the embodiments described above:
(i) the metrics can be for example memory usage, CPU usage, traffic and/or load; and/or
(ii) the statistics can be for example mean, standard deviation, kurtosis and/or entropy; and/or
(iii) the measure of distance can be for example Euclidean distance, L1 (Manhattan) distance and/or Canberra distance, or another suitable measure of distance; and/or
(iv) the spectral characteristics can be for example Fourier coefficients and/or wavelet coefficients; and/or
(v) the projection of feature vectors in a higher dimension space onto feature vectors in a lower dimension space can be derived for example from a Principal Components Analysis.

While particular elements, embodiments and applications of the present invention have been shown and described, it will be understood, that the invention is not limited thereto since modifications can be made without departing from the scope of the present disclosure, particularly in light of the foregoing teachings.

What is claimed is:
1. A method for detecting anomalies in a system comprising a plurality of servers, the method comprising:

monitoring a configuration of a server of the plurality of the servers;
receiving at least one metric corresponding to the server of the plurality of servers, wherein the at least one metric comprises one or more time-stamped log entries, the one or more time-stamped log entries representative of a performance or operation of a machine in an information technology environment;
computing statistics associated with the at least one metric;
using the at least one metric and the computed statistics to detect anomalies in the system, wherein the anomalies comprise a spatial environment anomaly, a temporal environment anomaly, a spatial behavior anomaly and a temporal behavior anomaly, wherein detecting anomalies in the system includes
generating a plurality of feature vectors by generating, for each of the plurality of servers, a feature vector in n-dimensional space, each of the feature vectors including at least one metric for a corresponding server and at least one of the statistics associated with the at least one metric or one or more spectral characteristics of the at least one metric for the corresponding server;
computing a center of mass of the plurality of feature vectors;
adjusting a threshold indicative of a degree of change of the configuration of the server between a first time and a second time, based on a user input in response to a user receiving an indication of an anomaly;
determining a degree of anomaly based on a distance of a server from the center of mass and the threshold; and
detecting an anomaly associated with the server based on a result of said determining;
generating an alert indicative of detection of the anomaly; and
directly triggering, in response to the alert, application of a protective measure to the server, by causing transmission of a message onto the network.

2. The method of claim 1, further comprising:
transforming the statistics into a particular feature vector in n-dimensional space; and
averaging values of each of the dimensions of each of the feature vectors to compute the center of mass.

3. The method of claim 1, wherein adjusting further comprises computing a weighted average of one or more thresholds.

4. The method of claim 1, further comprising:
transforming the statistics into a particular feature vector in n-dimensional space; and
averaging values of each of the dimensions of each of the feature vectors to compute the center of mass; and
computing a standard deviation of the values.

5. The method of claim 1, further comprising:
transforming the statistics into a particular feature vector in n-dimensional space; and
determining a set of values corresponding to each of the dimensions of each of the feature vectors;
computing a standard deviation of the values, wherein adjusting comprises,
removing a smallest data point and re-computing the standard deviation for remaining values;
determining whether a change in the re-computed standard deviation and the original standard deviation exceeds a predetermined threshold;
if the predetermined threshold is exceeded, adjusting the threshold to a value of the data point last removed.

6. The method of claim 1, further comprising:
transforming the statistics into a particular feature vector in n-dimensional space;
determining a set of values corresponding to each of the dimensions of each of the feature vectors; and
computing a standard deviation of the values, wherein adjusting comprises adjusting the threshold to a value of a smallest standard deviation value that has a specified degree of influence on the standard deviation of the set.

7. The method of claim 1, further comprising:
transforming the statistics into a particular feature vector in n-dimensional space;
determining a set of data values corresponding to each of the dimensions of each of the feature vectors;
dividing the data into quartiles, wherein adjusting comprises adjusting the threshold to a sum of a lower quartile value, and a product of an inter-quartile range and a gamma value based on a degree of skew of the data.

8. The method of claim 1, further comprising computing a true positive ratio and a false positive ratio for measuring an effectiveness of anomaly detection.

9. The method of claim 1, further comprising:
determining a number of false positive anomaly detections; and
when the number exceeds a predetermined value adjusting the threshold automatically.

10. The method of claim 1, further comprising:
rating the alert based on at least one of:
an anomaly score;
a persistence of the detected anomaly; and
divergence from previous patterns.

11. The method of claim 1, wherein the message comprises an HTTP POST to a throttling mechanism to quarantine a server having the anomaly.

12. The method of claim 1, wherein the at least one metric is selected from a group comprising real-time metrics, and replays of metrics collected prior to the start of the time period.

13. The method of claim 1, wherein the at least one metric is selected from a group consisting of memory usage, CPU usage, traffic and load.

14. The method of claim 1, further comprising calculating the one or more statistics for the at least one metric for each of the plurality of servers for each of multiple time windows, wherein the statistics are selected from a group consisting of mean, standard deviation, kurtosis and entropy.

15. The method of claim 1, further comprising calculating the one or more spectral characteristics of the at least one metric, wherein the spectral characteristics are selected from a group consisting of wavelet coefficients and Fourier coefficients.

16. The method of claim 1, further comprising:
transforming the statistics into a corresponding feature vector in n-dimensional space; and
averaging values of each of dimensions of each of the feature vectors to compute the center of mass, wherein the distance measurement from a feature vector of a first server of the plurality of servers to the center of mass is one selected from a group consisting of Euclidean distance, L1 (Manhattan) distance, and Canberra distance.

17. The method of claim 1, wherein the at least one metric comprises a synchronous time series metric.

18. The method of claim 1, wherein the at least one metric comprises at least one synchronous time series metric comprising a series of time stamp and value tuples generated at regular intervals.

19. The method of claim 1, wherein the at least one metric comprises at least one synchronous time series metric comprising a series of time stamp and value tuples generated at regular intervals, and wherein the synchronous time series metrics comprise a number of user requests per second, and the CPU load per second.

20. The method of claim 1, wherein the at least one metric comprises at least one synchronous time series metric comprising:
   a synchronous time series of average packet size value per second;
   a maximum average packet size value over a time interval; and
   a minimum average packet size value over the time interval.

21. The method of claim 1, wherein the at least one metric comprises asynchronous time-stamped log entries, wherein the method further comprises transforming the asynchronous time-stamped log entries into one or more synchronous time series metrics.

22. A non-transitory computer readable medium having instructions stored thereon, execution of which by at least one processor in a computer system causes the computer system to perform an anomaly detection method in an information technology system, the method comprising:
   monitoring a configuration of a server of the plurality of the servers; receiving at least one metric corresponding to the server of the plurality of servers, wherein the at least one metric comprises one or more time-stamped log entries, the one or more time-stamped log entries representative of a performance or operation of a machine in an information technology environment;
   computing statistics associated with the at least one metric;
   using the at least one metric and the computed statistics to detect anomalies in the system, wherein the anomalies comprise a spatial environment anomaly, a temporal environment anomaly, a spatial behavior anomaly and a temporal behavior anomaly, wherein detecting anomalies in the system includes
      generating a plurality of feature vectors by generating, for each of the plurality of servers, a feature vector in n-dimensional space, each of the feature vectors including at least one metric for a corresponding server and at least one of the statistics associated with the at least one metric or one or more spectral characteristics of the at least one metric for the corresponding server;
      computing a center of mass of the plurality of feature vectors;
      adjusting a threshold indicative of a degree of change of the configuration of the server between a first time and a second time, based on a user input in response to the user receiving an indication of an anomaly;
      determining a degree of anomaly based on a distance of a server from the center of mass and the threshold; and
      detecting an anomaly associated with the server based on a result of said determining;
   generating an alert indicative of detection of the anomaly; and
   directly triggering, in response to the alert, application of a protective measure to the server, by causing transmission of a message onto the network.

23. The non-transitory computer readable medium claim 22, wherein the method further comprises:
   transforming the statistics into a corresponding feature vector in n-dimensional space; and
   averaging values of each of the dimensions of each of the vectors to compute the center of mass.

24. The non-transitory computer readable medium claim 22, wherein the method further comprises:
   transforming the statistics into a corresponding feature vector in n-dimensional space; and
   averaging values of each of the dimensions of each of the vectors to compute the center of mass, wherein the degree of anomaly is based on a distance of a server from the center of mass.

25. The non-transitory computer readable medium claim 22, wherein adjusting further comprises computing a weighted average of one or more thresholds.

26. A system comprising:
   at least one processor and at least one memory;
   a plurality of servers communicatively coupled to a management module; and
   a plurality of agents each provisioned to one of the plurality of servers and in communication with the servers and the management module for performing anomaly detection, wherein each of the agents are further configured to,
      monitor a configuration of a server of the plurality of the servers;
      receive at least one metric corresponding to the server of the plurality of servers, wherein the at least one metric comprises one or more time-stamped log entries, the one or more time-stamped log entries representative of a performance or operation of a machine in an information technology environment;
      compute statistics associated with the at least one metric;
      use the at least one metric and the computed statistics to detect anomalies in the system, wherein the anomalies comprise a spatial environment anomaly, a temporal environment anomaly, a spatial behavior anomaly and a temporal behavior anomaly, wherein detecting anomalies in the system includes
         generating a plurality of feature vectors by generating, for each of the plurality of servers, a feature vector in n-dimensional space, each of the feature vectors including at least one metric for a corresponding server and at least one of the statistics associated with the at least one metric or one or more spectral characteristics of the at least one metric for the corresponding server;
         computing a center of mass of the plurality of feature vectors;
         adjust a threshold indicative of a degree of change of the configuration of the server between a first time and a second time, based on a user input in response to the user receiving an indication of an anomaly;
         determining a degree of anomaly based on a distance of a server from the center of mass and the threshold; and
         detecting an anomaly associated with the server based on a result of said determining;
      generate an alert indicative of detection of the anomaly; and directly trigger, in response to the alert, application of a protective measure to the server, by causing transmission of a message onto the network.

27. The system of claim 26, wherein each of the agents are further configured to:
   transform the statistics into a corresponding feature vector in n-dimensional space; and
   average values of each of the dimensions of each of the vectors to compute the center of mass.

28. The system of claim 26, wherein each of the agents are further configured to:
   transform the statistics into a corresponding feature vector in n-dimensional space; and
   average values of each of the dimensions of each of the vectors to compute the center of mass, wherein the degree of anomaly is based on a distance of a server from the center of mass.

29. The method of claim 1, wherein the message causes the server to be placed into quarantine.

* * * * *